United States Patent [19]

Vancil

[11] Patent Number: 5,198,730
[45] Date of Patent: Mar. 30, 1993

[54] COLOR DISPLAY TUBE

[76] Inventor: Bernard K. Vancil, 21070 SW. Tile Flat Rd., Beaverton, Oreg. 97007

[21] Appl. No.: 915,020

[22] Filed: Jul. 16, 1992

Related U.S. Application Data

[63] Continuation-in-part of Ser. No. 827,760, Jan. 29, 1992.

[51] Int. Cl.[5] .............................................. H01J 29/80
[52] U.S. Cl. ..................................... 315/376; 313/405; 358/66
[58] Field of Search ................. 315/376; 313/404, 405; 358/66

[56] References Cited

U.S. PATENT DOCUMENTS 3,600,625  8/1971  Tsuneta et al. ........................ 358/66
4,451,860  5/1984  Honjo et al. ............................ 360/77

OTHER PUBLICATIONS

Wurtz, "Applications of Miniature CRT Displays", *Information Display*, Sep. 1987, pp. 16–18.
Doyeux and House, "Beam-Index Cathode-Ray Tubes", *Information Display*, Jan. 1990, pp. 12–15.
Tanuma et al., "A High Resolution CCD Imager Module With Swing Operation", *Solid State Imagers and Their Applications*, SPIE vol. 591, pp. 94–101.

Primary Examiner—Theodore M. Blum
Attorney, Agent, or Firm—Dellett, Smith-Hill and Bedell

[57] ABSTRACT

A color cathode ray tube employs a shadowmask having substantially vertical slots positioned between a single electron gun and substantially vertical color phosphor stripes on the faceplate of the tube. Piezoelectric bimorph actuators translate the shadowmask back and forth in a direction generally perpendicular to the direction of the slots and stripes in synchronization with field sequential color information to excite the phosphor stripes. In an alternative embodiment, the phosphor screen is moved relative to a fixed shadowmask. During the relative movement between the shadowmask and screen in a first direction, video information is provided from a memory in a first sequential manner, while for relative movement in a second direction, the video information is read out of memory in a reverse direction for executing a reverse raster starting from the bottom of the screen. The slots and phosphor stripes are skewed slightly with respect to one another to maintain proper color registration. In a further embodiment, instead of a shadowmask, a gating array is located between a broad source of electrons and the phosphor screen.

29 Claims, 12 Drawing Sheets

COLOR DISPLAY TUBE

This is a continuation-in-part of copending application 07/827,760 filed on Jan. 29, 1992.

BACKGROUND OF THE INVENTION

The present invention relates to color display tubes and particularly to such a tube that is easily miniaturized.

Conventional color display cathode ray tubes such as used in television receivers and computer display monitors ordinarily employ three electron guns, one associated with each of the primary colors. A perforated shadowmask located between the electron guns and areas of colored light emitting phosphors on the tube faceplate defines beam paths between the electron guns and the phosphor areas. The openings in the shadowmask are carefully aligned to allow only electrons from a particular gun to pass through and strike a corresponding color area; however, there are always problems of misconvergence with the complex three gun construction. An electron beam may have the correct angle to address only its color at the center of the screen, but it may have a somewhat different angle near the edge of the screen. The tube's deflection yoke does not deflect each electron beam to the same extent so the center of deflection appears to shift. Slots in the shadowmask must be made narrower than theoretically desirable, or significant dead regions must be established between phosphor areas in order to maintain color purity. These expedients reduce efficiency and brightness of the display.

The aforementioned problems are particularly troublesome with regard to miniaturized color television tubes desired for monitors or view finders of video cameras, and for "virtual environment" applications wherein it is sought to generate realistic full color stereoscopic images of a simulated environment. Resolution problems attributable to registration and convergence become nearly insurmountable in the case of a miniaturized, high resolution color tube and moreover the mere presence of three electron guns makes the device difficult to miniaturize. Therefore, most presently available miniature cathode ray tubes generate only black and white displays.

Beam index tube technology has been employed for the purpose of utilizing only one electron gun in a color tube, wherein the screen includes four phosphor components—the three primary colors plus one which produces ultra-violet light detected by a sensor. Although this concept is well known and would appear to enhance image brightness since the shadowmask is not employed, resolution is disappointing in the case of miniature tubes and the circuitry for driving the tube is complicated.

SUMMARY OF THE INVENTION

In accordance with the present invention, means are provided in a color display cathode ray tube for bringing about relative movement between a color tube shadowmask or the like and the screen in order to vary the alignment between phosphor screen areas and openings in the shadowmask. Preferably a field sequential storage means for color information is provided from which the color information is written on the CRT screen by one gun in a forward raster direction as relative movement between shadowmask and screen occurs in a first lateral direction, and information is then written from memory by the same gun in a reverse raster manner as relative movement between the shadowmask and the screen takes place in a second direction.

The relative movement between the shadowmask or similar device and the screen may involve cyclic movement of the mask while the screen is held stationary, or movement of the screen while the mask is stationary. In either case, the cyclic movement is preferably provided by means of a plurality of piezoelectric bimorph actuators disposed proximate corners of the mask and screen. DC offset or bias voltages may also be supplied to the piezoelectric bimorph members for positioning and skewing slots in the mask relative to phosphor stripes on the screen so that proper color alignment is preserved during a given color field despite continuous movement between mask and screen.

A related embodiment of the present invention controls an active gating array which is interposed between an electron source and a phosphor screen. Not only can critical positioning of the array be adjusted, but also colors can be selected in a manner for reducing the number of array conductors and inputs.

It is accordingly an object of the present invention to provide an improved full color display apparatus which is more efficient and/or less expensive.

It is another object of the present invention to provide an improved color display apparatus that may be relatively miniaturized without sacrifice of resolution.

It is another object of the present invention to provide an improved color cathode ray tube for providing color displays including a large number of scan lines within a limited space.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION

Figure 1:
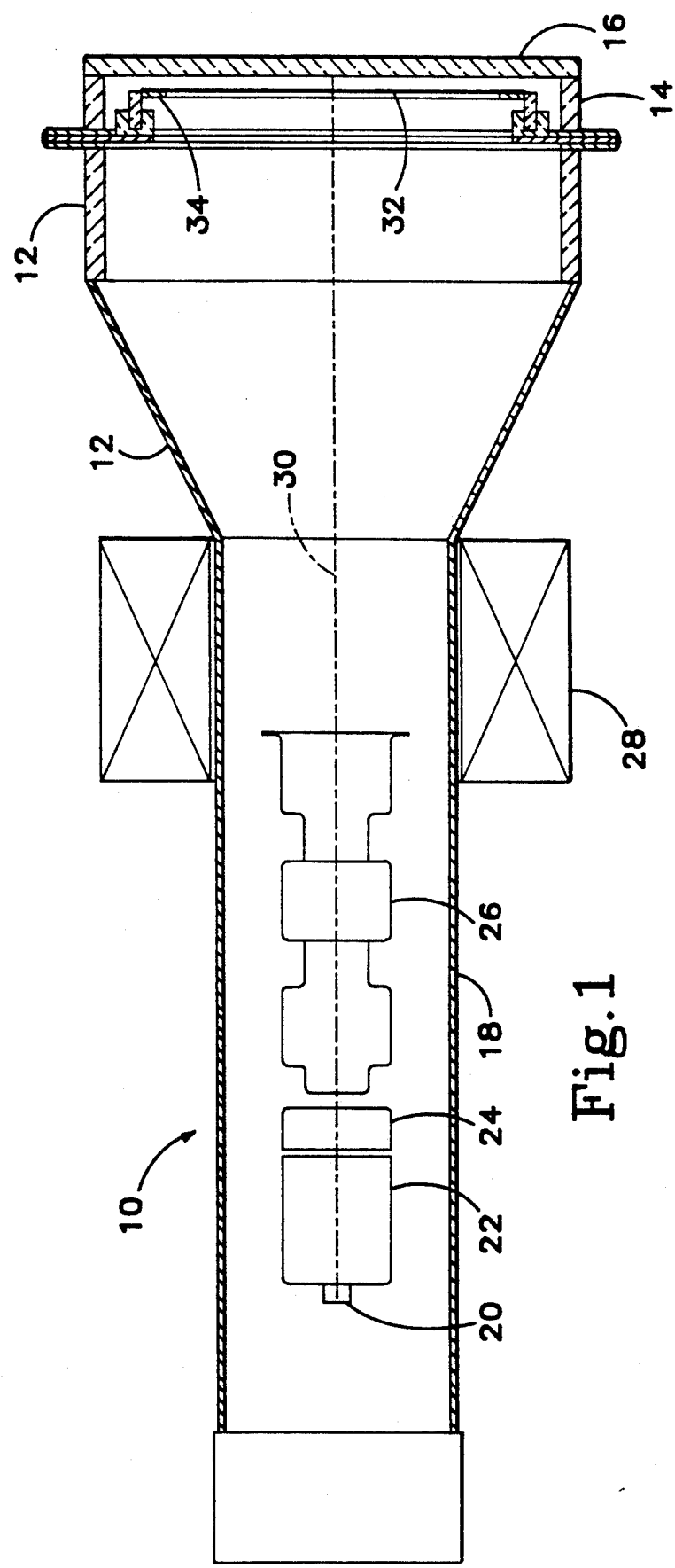
FIG. 1 is a longitudinal cross section of a cathode ray tube according to the present invention.

Referring to the drawings and particularly to FIG. 1, a cathode ray display tube 10 comprises a funnel assembly 12 and a front end assembly 14 aligned with the funnel assembly and provided with a faceplate 16 having an inner surface upon which phosphor material has been deposited. The neck portion 18 of the funnel assembly receives an electron gun structure comprising an electron emitting cathode 20, grid 22, first anode 24, and focus assembly 26 by means of which an electron beam, the path of which is illustrated at 30, is directed toward the phosphor on the inward side of faceplate 16. Z-axis information is supplied to grid 22 by means of which the intensity of the electron beam is modulated. The deflection yoke 28 causes the electron beam to scan in X and Y axis directions, conventionally in raster fashion, so that the faceplate or screen is scanned while the intensity of the beam is varied in accordance with input signal information. In a conventional color display tube, the phosphor upon the inside of the faceplate comprises separate areas of phosphor material each capable of producing luminescence in a different color when scanned by the electron beam. Also, a shadowmask 32 mounted on peripheral frame 34 is interposed between the electron gun structure and the faceplate in such manner that the electron beam from a given origin strikes phosphor areas on the faceplate producing a given color.

Figure 2:
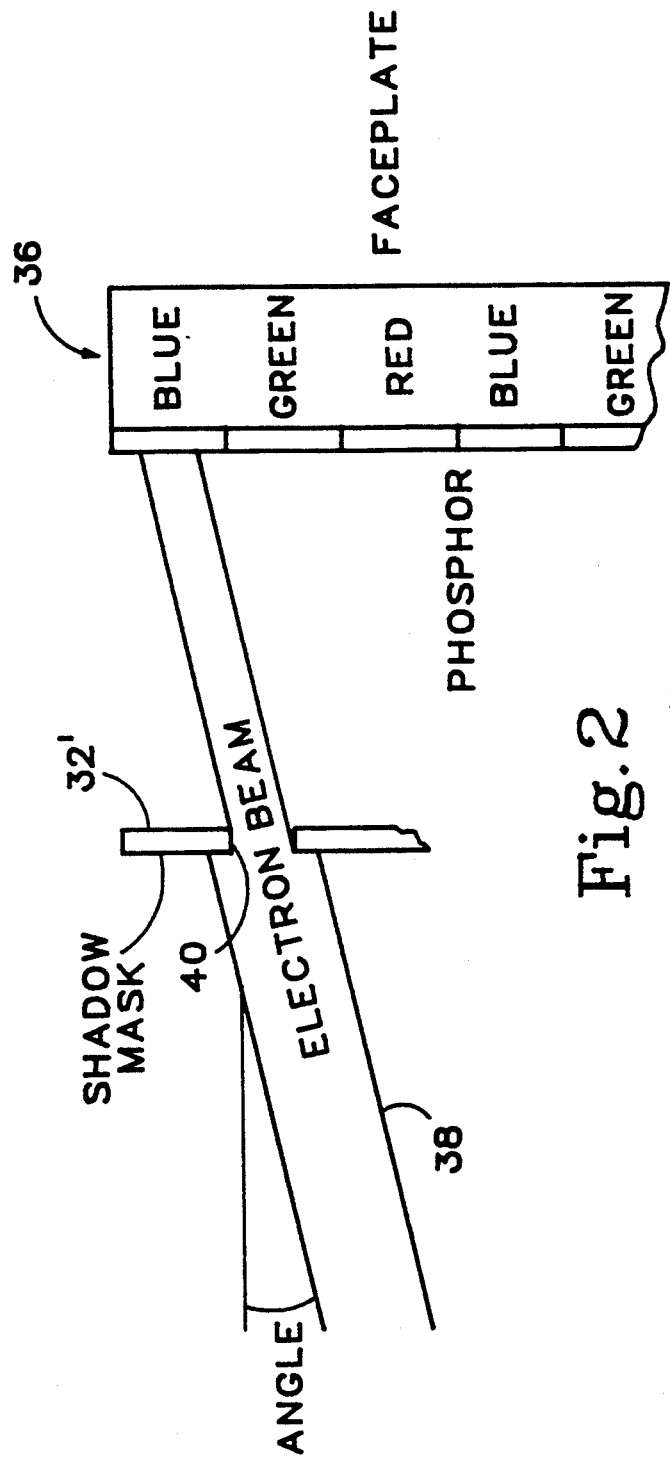
FIG. 2 is a schematic representation of a typical prior art shadowmask and screen system looking vertically downwardly thereupon.

In a conventional color cathode ray tube, the phosphor areas on the faceplate comprise vertical stripes capable of emitting red, green or blue light, the stripes repeating in a periodic pattern across the faceplate. Such a configuration is illustrated in schematic fashion at 36 in FIG. 2 representing the prior art. In this case, the electron beam 38 is shown as directed through a vertical slot 40 in shadowmask 32' to reach the blue phosphor on faceplate 36.

In the conventional color CRT, three electron guns of the type illustrated in FIG. 1 are employed side by side and each generates its own electron beam which strikes phosphor stripes of only a given color. Thus, the electron beam 38 in FIG. 2 is generated by a "blue gun" and, due to the interposition of shadowmask 32', this electron beam can only intersect blue phosphor stripes on the faceplate. Slots, such as slot 40, are carefully aligned with the color phosphor stripes so as to allow only electrons having a correct angle with respect to the CRT axis to pass through the shadowmask and excite the given color. The color selection is accomplished by selectively energizing a "red gun", a "green gun" or a "blue gun". Although this system is commonly used for television purposes, several problems mentioned above arise especially in the case of miniature CRTs as used for small video camera monitors and the like.

Figure 4:
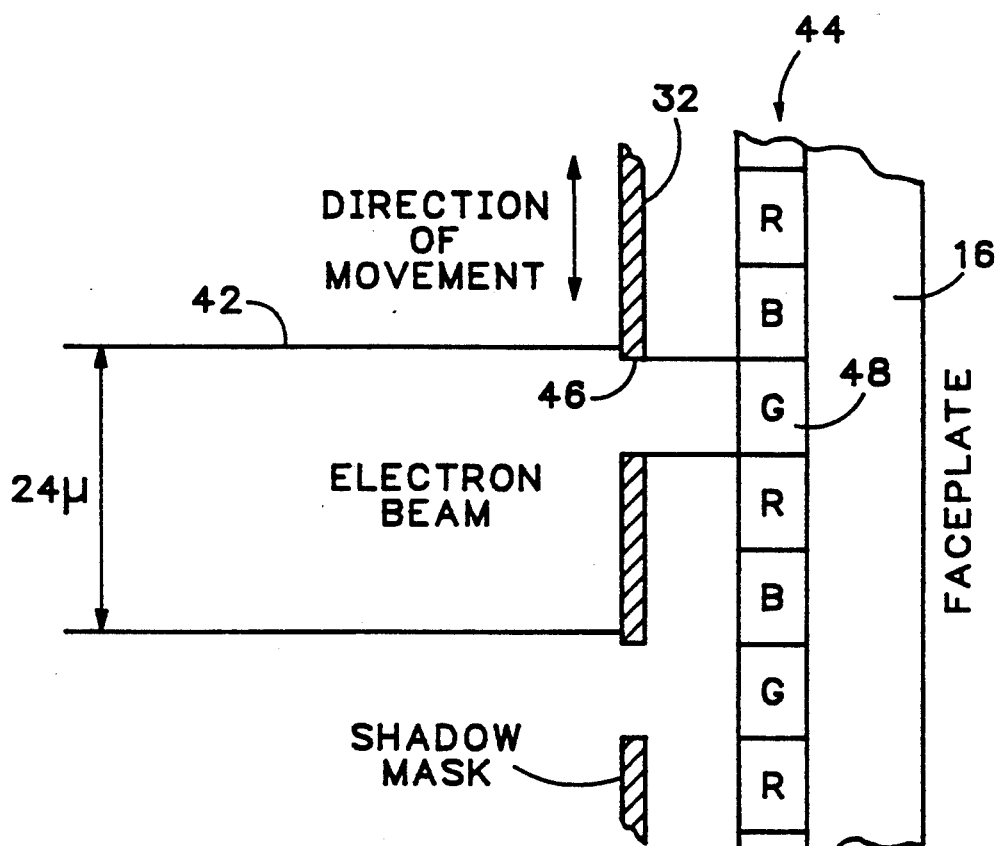
FIG. 4 is a schematic representation of a combined shadowmask and screen employed in accordance with the present invention.

In accordance with an embodiment of the present invention, a single electron beam generated by a single electron gun structure illustrated in FIG. 1 is aimed substantially directly at phosphor stripes 44 on faceplate 16 through shadowmask 32 which is moved in a horizontal direction to provide color selection. For the position of the shadowmask illustrated in FIG. 4, the single electron beam passes though slot 46 and intersects green phosphor stripe 48. However, the shadowmask is substantially continuously in movement, cyclically back and forth, so that for approximately one-third of the time, only the phosphor stripes of a given color are excited. Since only one electron gun is used, many of the registration and deflection problems heretofore encountered as well as problems of size encountered with a three-gun tube no longer exist. Furthermore, the shadowmask 32 can be placed relatively close to the faceplate as shown in FIG. 4 inasmuch as geometry problems with the three-gun tube (FIG. 2) are not present. That is, the slots in the shadowmask no longer have to align with three separate guns as well as corresponding phosphor stripes.

Figure 5:
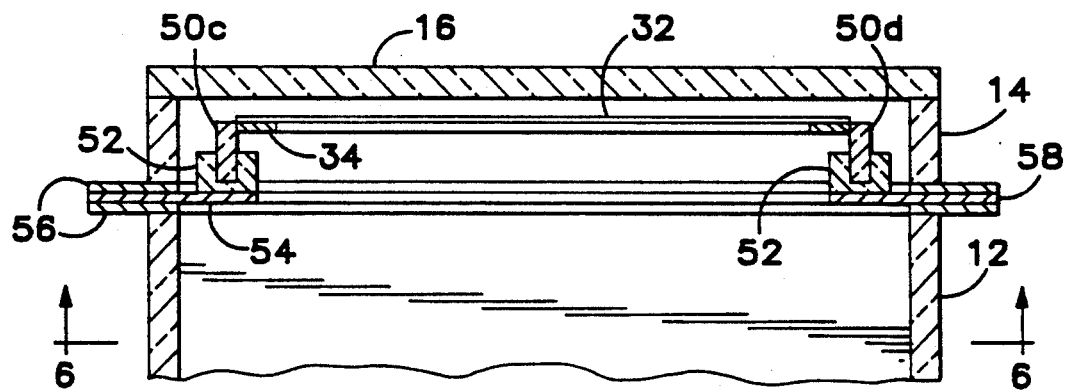
FIG. 5 is a horizontal cross section, partially broken away of a forward portion (as taken at 5—5 in FIG. 6) of the FIG. 1 cathode ray tube.
Figure 6:
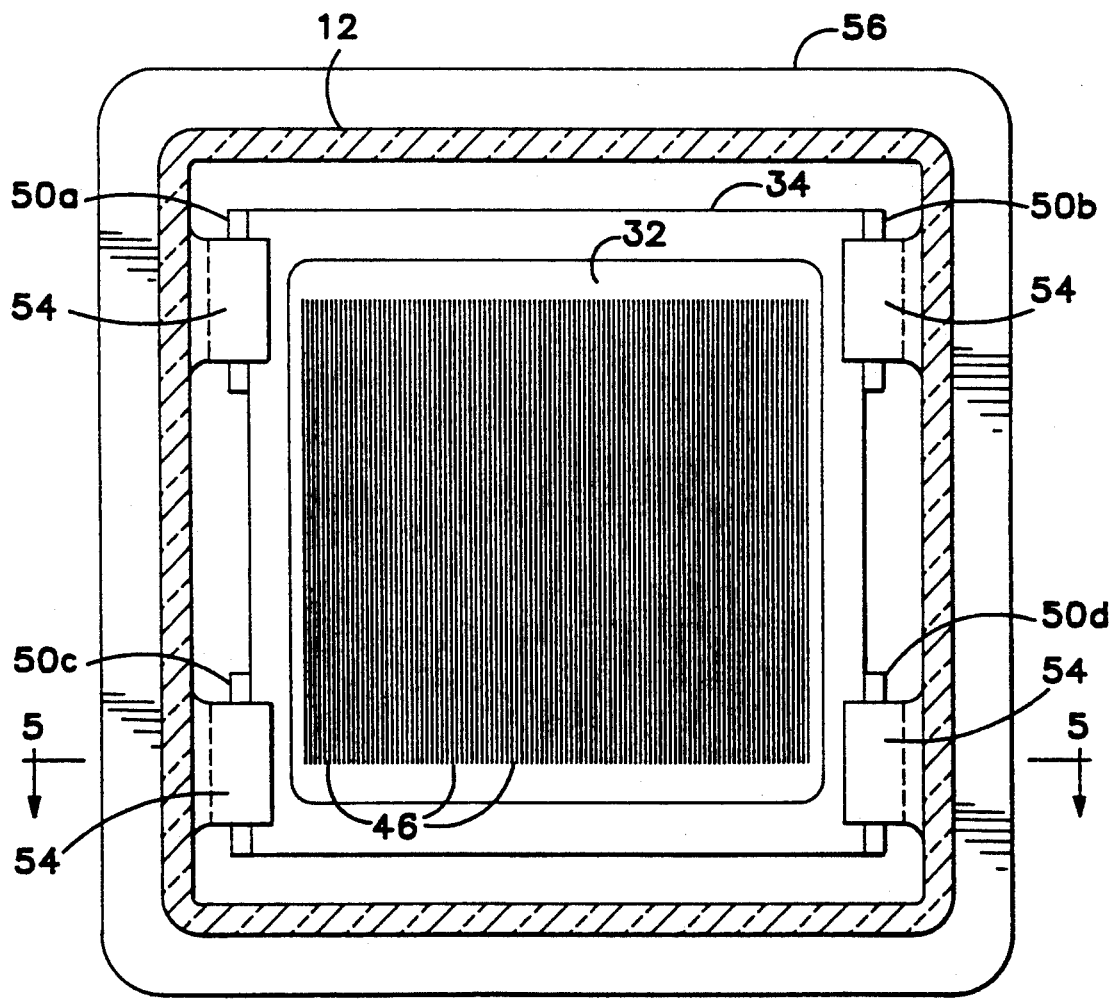
FIG. 6 is a transverse section of the same cathode ray tube as taken at 6—6 in FIG. 5.
Figure 7:
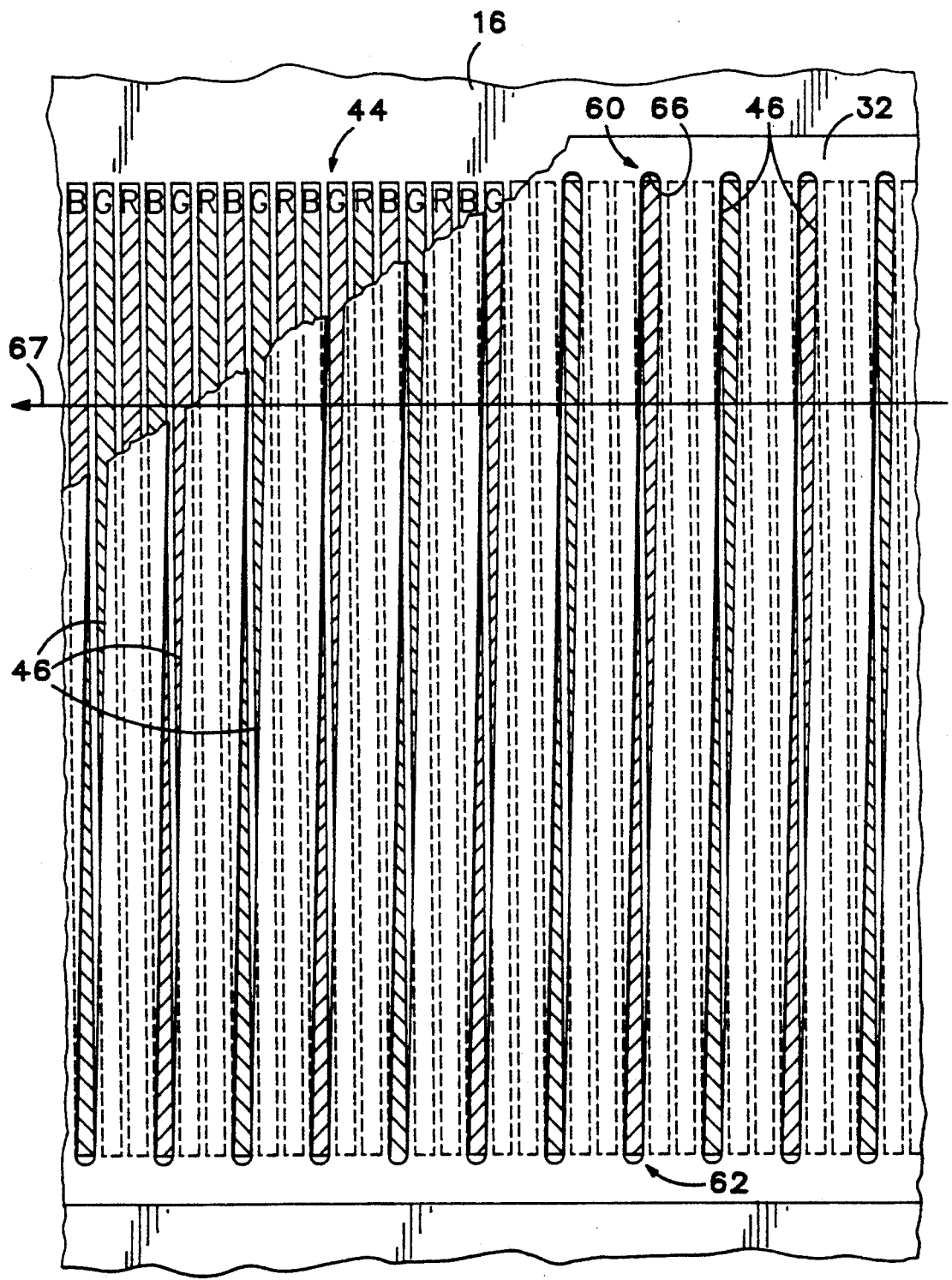
FIG. 7 is a broken away view of a portion of the shadowmask shown in FIGS. 1, 5 and 6, looking forwardly through the shadowmask toward phosphor areas on the tube face or screen.

The structure according to the present invention will be more fully understood with respect to the illustrations of FIGS. 5-7. Oscillatory horizontal movement of shadowmask 32 is preferably achieved by operation of piezoelectric bimorph actuators 50 upon which the frame 34 of shadowmask 32 is mounted. The piezoelectric bimorph actuators comprise piezoelectric ceramic plates secured within ceramic holders 52 on their rearward end, and extending forwardly to frame 34 for supporting the frame 34 in cantilever fashion. As understood by those skilled in the art, the bimorph actuators bend away from the vertical plane thereof when a potential is applied across the bimorph element electrodes. The bimorph elements on either side of the tube are operated out of phase, or in "push-pull" relation, so that the shadowmask can be translated as desired. As illustrated in FIG. 6, four such actuators 50a, 50b, 50c and 50d are preferably positioned near respective corners of the shadowmask whereby when a positive-going waveform for example is applied to elements 50a and 50c, a corresponding negative-going waveform is applied to elements 50b and 50d. The movement of the shadowmask is substantially proportional to the potentials applied such that the shadowmask can be positioned where desired. Although four actuators are illustrated, only one or two need to be employed, e.g. elements 50a and 50c may be utilized with resilient biasing means being substituted for elements 50b and 50d.

Members 52 are secured with a frit seal to inwardly extending support plates 54 welded between flanges 56 which are in turn frit sealed to cathode ray tube portions 14 and 12. The flange edges at 58 are welded together to complete a seal.

The positioning of the shadowmask relative to phosphor stripes on the faceplate is illustrated in FIG. 7 wherein the inside of faceplate 16 is viewed through the shadowmask 32. It will be realized the dimensions in FIG. 7 are exaggerated for the purposes of explanation.

In a specific example, the phosphor stripes 44 extended in a vertical direction across the faceplate and were each seven microns wide while spaced from one another by one micron to provide guard bands. The stripes are respectively adapted to produce blue, green and red light in a repeating pattern across the faceplate.

Slots 46 in shadowmask 32 also have a width of seven microns but are spaced from one another, center-to-center, by a distance of twenty-four microns. One thousand parallel, vertical slots are provided in the shadowmask according to an embodiment of the present invention. All the phosphor stripes 44 are parallel to one another and the slots 46 are parallel to one another, but the slots are slightly skewed from a parallel relation with the stripes. In particular, considering a slot 66, when the top end of the slot at 60 is in registration with a green stripe, the bottom end of the same slot at 62 is in registration with a blue stripe.

The electron beam in a preferred embodiment is adapted to scan across the structure in a horizontal direction indicated at 67 while the shadowmask oscillates back and forth in the same direction, but at a much slower rate. As hereinafter more fully described, input video information is provided in a field sequential manner such that a field of a given color is written by the electron beam after which the next raster scan is adapted to produce a different color.

During a green field, let us assume that scan lines 67 for a given raster scan start at the top of the screen and as the electron beam moves vertically from top to bottom of the screen, the electron beam is deflected horizontally so that successive, nearly horizontal scan lines occur. As the electron beam scans across the top of the screen during a green field, it will be observed that slot 66 perfectly registers with a green stripe therebeneath. Then as successive scan lines are executed, farther and farther downwardly on the screen, the shadowmask 32 will be moved horizontally (to the right in FIG. 7) so that the slot 66 continues to register with a green stripe. When the bottom of the screen is reached, slot 66 will have moved to the right in FIG. 7 by the distance of one stripe and the slot is still aligned with the green phosphor. At this time, however, the top of slot 66 will be aligned with red phosphor stripe. Therefore, as the next field, i.e., the red field, is produced, the slot 66 is correctly aligned to produce the same.

As the electron beam executes a vertical retrace and starts to scan horizontally again across the top of the faceplate, a red color field is generated and the color red is maintained as the faceplate moves farther to the right so as to retain proper alignment between the slot and the red stripe. Skewing between the slots and the phosphor stripes is eight microns in the given example, i.e., so that when the top of a given slot registers with one color stripe, the bottom of the same slot registers with the next color stripe (to the left in FIG. 7).

Figure 3:
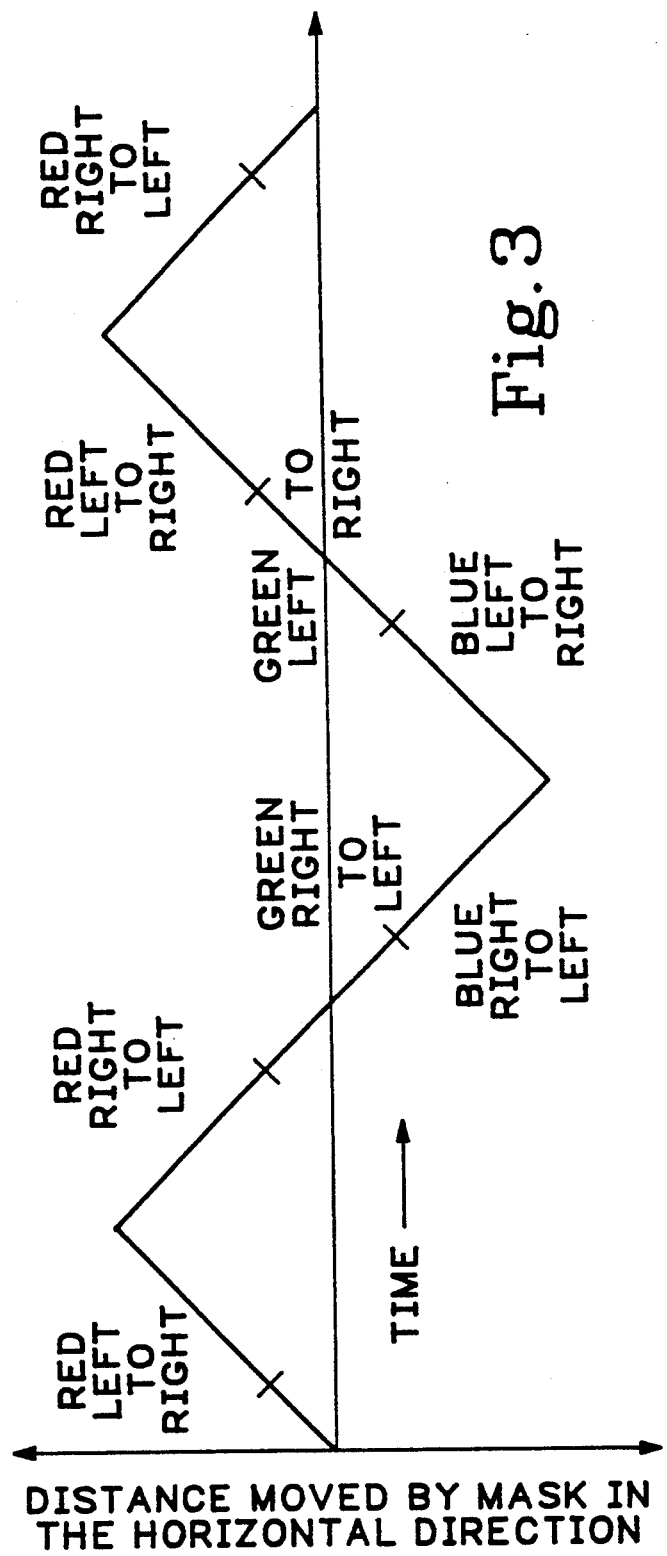
FIG. 3 is a graphic representation of a triangular waveform employed to drive piezoelectric means according to the present invention for moving a shadowmask or screen in a cyclic manner.

The movement of the shadowmask is depicted by the FIG. 3 graph. The triangular wave as illustrated in FIG. 3 is preferably applied in push-pull fashion to the bimorph actuators 50, the triangular wave suitably having a frequency of 30 Hz. FIG. 3 correlates successive color fields with movement of the shadowmask under the influence of the triangular wave. Assume, as in the previous example, that the shadowmask is moving from left to right to produce a green field. It will be seen that the next field (in the part of the waveform marked left to right in FIG. 3) is a red field. However, when the red field is concluded, the shadowmask will have been translated to its farthest right position, i.e., proximate the top of the triangular wave in FIG. 3, and the shadowmask now starts to execute leftward movement. It will be appreciated the lower portion of each slot still resides over a red phosphor stripe at this time, and therefore another red field can be written if the scanning of the electron beam commences at the bottom of the screen and proceeds upwardly, i.e., executing a reverse raster. As hereinafter more fully disclosed, this procedure is facilitated by storing red field information in memory and reading it out in reverse.

When the electron beam scans horizontal lines starting at the bottom left and proceeding upwardly until the topmost horizontal line is produced, it will be seen from the FIG. 7 illustration that the slots will continuously uncover the red phosphor for right to left movement of the shadowmask. After the red field, a reverse green field is written in a corresponding manner, followed by a blue field. At the end of the blue field in the right to left portion of the FIG. 3 waveform, the shadowmask will be in its leftmost position with the triangular waveform at its lowest point. Now, since the electron beam will be at the top of the screen and the blue phosphor is still uncovered, another blue field is written in a top to bottom writing mode while the shadowmask moves to the right. After writing of the second blue field, a green field is written again.

For the example given, the shadowmask translates a distance to provide mask deflection while the beam is unblanked for twelve microns in each direction, with home or zero position (at the horizontal axis in FIG. 3) corresponding to the middle of the green field when the electron beam is in the center of the screen and registers with the green stripe at this point. It will be seen that to complete half the green field, the shadowmask must translate by four microns in the horizontal direction, followed by eight microns to complete a red field during the left to right movement. Similarly, in right to left movement, the shadowmask would translate by four microns from the center or home position to complete a green field, and eight more microns of movement are required to complete a blue field.

In the given example, each color field comprised 1,000 horizontal scan lines, wherein three fields are required to provide a color picture. Therefore, each field is completed in approximately 5.3 milliseconds and each picture is completed in approximately 16 milliseconds.

Assuming a color change is to take place immediately at the side edge of a given slot as the electron beam scans thereacross, the electron beam is turned off when the last part of the electron beam leaves such slot. Of course, if the next pixel is to be written, the electron beam is not turned off.

Figure 8:
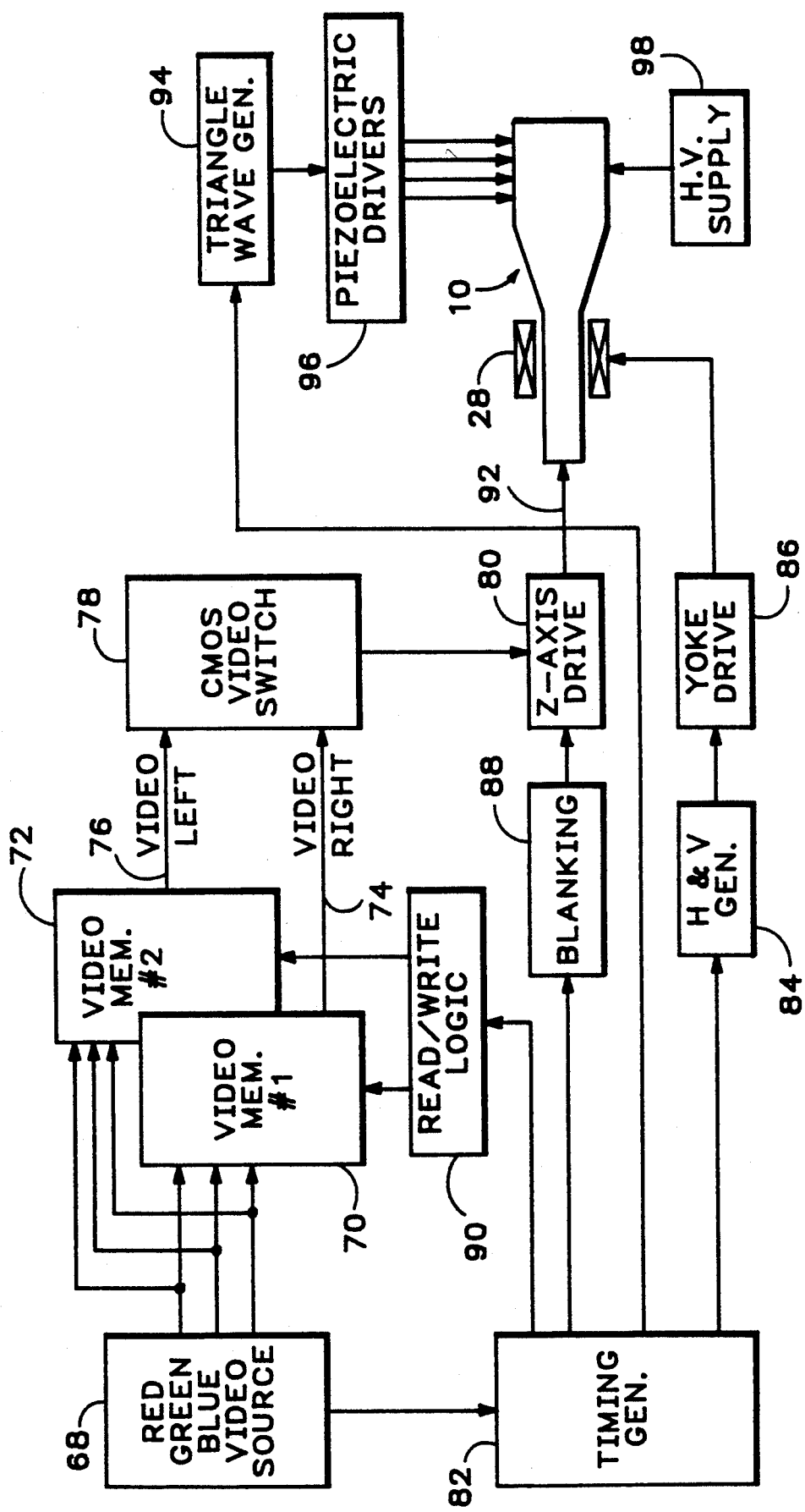
FIG. 8 is a block diagram of circuitry for operating the display tube according to the present invention.

Referring to FIG. 8, comprising a block diagram of circuitry for operating the display tube according to the present invention, video information is received from a source 68, comprising a computer, TV system or the like that provides respective red, green and blue signals which have been separated and digitized. The information is stored in buffer memories 70 and 72 wherein fields of respective color information are separately stored in memory 70 while memory 72 is being read out, and vice versa. The reading and writing of these memories is controlled by logic 90 in response to timing generator 82 which is synchronized from the video source 68.

As the shadowmask 32 is moved from left to right as indicated on the FIG. 3 waveform, information from memory 70 comprising consecutive blue, green and red field pixel data, is provided to CMOS video switch 78, at the same time further input video information is supplied to memory 72 from source 68. Switch 78 couples the video information from memory 70 to Z-axis drive circuit 80 for providing intensity information to CRT 10 by way of lead 92. The consecutive blue, green and red fields are read from memory 70 as timing circuit 82, controlling deflection yoke 28 by way of deflection signal generator 84 and yoke drive 86, causes deflection of the electron beam of tube 10 in a conventional raster pattern for each field. Raster deflection provides a multiplicity of "horizontal" lines (1000 in the case of the preferred embodiment), and the lines consecutively start at the left side of the screen but at further downwardly displaced positions in response to the vertical scan signal from generator 84. After the consecutive blue, green and red fields are written as indicated on the "left to right" portion of the FIG. 3 waveform, the roles of memories 70 and 72 are reversed whereby video information is accumulated as red, green and blue fields in memory 70 while memory 72 is read out via lead 76. Switch 78 now couples consecutive red, green and blue information in reverse order from memory 72 to Z-axis drive circuit 80. However, timing generator 82 controls scan generator 84 for bringing about a raster scan that now starts at the bottom left of the screen and proceeds upwardly. Consecutive red, green and blue fields are written by CRT 10 for the right to left portion of the FIG. 3 waveform.

The triangular wave of FIG. 3 is produced by generator 94 in response to timing generator 82 and in turn causes piezoelectric drivers 96 to provide corresponding input to piezoelectric bimorph actuators 50 in a push-pull manner as hereinbefore mentioned so that for the left to right portion of the FIG. 3 waveform, the actuators 50 cooperate to move the shadowmask from left to right, and whereby the same bimorph actuators are driven to cause reverse movement of the shadowmask from right to left in response to the descending portion of the FIG. 3 waveform. Cathode ray tube 10 is provided with a conventional high voltage supply 98.

Figure 9:
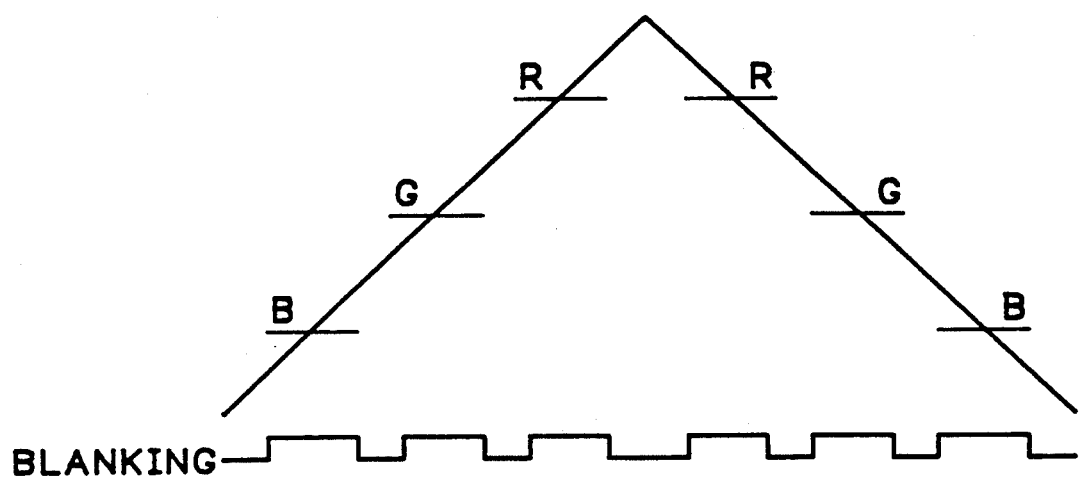
FIG. 9 is a waveform chart partially illustrating a blanking waveform signal utilized by the FIG. 8 circuit.

The electron beam of the cathode ray tube 10 is blanked by means of blanking generator 88 operated by timing generator 82 when the electron beam is accomplishing vertical retrace or horizontal retrace, and during the peaks of the FIG. 3 waveform as produced by triangle wave generator 94. The blanking signal is illustrated in FIG. 9 relative to the triangle wave applied to the bimorph actuators. Blanking is indicated by the relatively negative portions of the blanking waveform. Horizontal blanking, i.e., between individual raster scan lines, is not illustrated in FIG. 9.

Shadowmask 32 is suitably manufactured from a thin (0.5 mil) sheet of molybdenum or invar stretched in flat tension across frame 34 and provided with one thousand parallel vertically oriented slots or openings 46 seven microns in width as hereinbefore described, and which extend across nearly the whole vertical dimension of the shadowmask. The slots may be manufactured by conventional photo-etching techniques or other means such as electroforming. Reinforcing ribs (not shown) may be provided across the slots.

The phosphor stripes 44 are suitably deposited using the shadowmask and employing standard photoresist techniques. A single kind of fine particle phosphor (2 micron) is deposited on the screen and a photoresist is applied. The photoresist is developed through the shadowmask that is to be used on the same tube. The undeveloped photoresist and phosphor are etched off leaving discrete bands of this phosphor. Then, a new layer of phosphor, of a different color, is deposited and photoresist is again applied. The mask is moved over by eight microns and new stripes are illuminated and developed. Again, all the phosphor is etched away except for the region under the mask openings. Finally, a third phosphor is laid down and the process is repeated except the mask is moved over by a further eight micron distance. The screen is then lacquered and aluminized.

The piezoelectric bimorph drivers are formed of type G-1195 ceramic material obtained from Piezo Systems of Cambridge, Massachusetts. While this material is suitable, it is apparent that other equivalent materials may be substituted therefor. The bimorph actuators are mounted in the manner illustrated such that application of the appropriate potential across opposite electrodes thereof will cause the actuator to bend to a substantially proportional extent. The shadowmask is mounted in a cantilevered fashion at the end of the respective bimorph actuators and it is seen that push-pull operation of the actuators in the manner described will bend the actuators in a direction to cause substantially linear sideways movement of the shadowmask. Four bimorph actuators are suitably employed, one at approximately each corner of the shadowmask, and provide for the skewing of the shadowmask relative to the stripes in the manner illustrated in FIG. 7. To provide the skewing of the shadowmask by approximately one stripe width from top to bottom of the mask, a selected DC bias or offset voltage is applied to the bimorph actuators, such as bimorph actuators 50c and 50d, by driver circuit 96 to procure the slight leftward tilt at the bottom of the shadowmask illustrated in FIG. 7. Of course, a bias of the reverse polarity can be applied to actuators 50a and 50b, or relatively opposite bias voltages may be applied to upper and lower actuators. However, for moving the mask from side to side, actuators 50a and 50c still receive a relatively positive going portion of the FIG. 3 waveform when actuators 50b and 50d receive the inverse during horizontal movement of the shadowmask in a first direction. When the shadowmask is translated horizontally in a second direction, actuators 50a and 50c receive a relatively negative going part of a triangular waveform with actuators 50b and 50d receiving the inverse. While four actuators are preferred, as mentioned before a fewer number, or for that matter a larger number, may be utilized to bring about movement of the shadowmask.

Construction of the tube is completed by evacuating the same and baking it out at a fairly high temperature. The cathode coating is converted to oxide by applying heater voltage, and the internal electron gun parts are induction heated. The cathode is activated by drawing current to the grid and finally the tube is pinched off and removed from the vacuum pumps. A small getter is flashed. The bimorph actuators are preferably polarized after the tube is thus processed.

Figure 10:
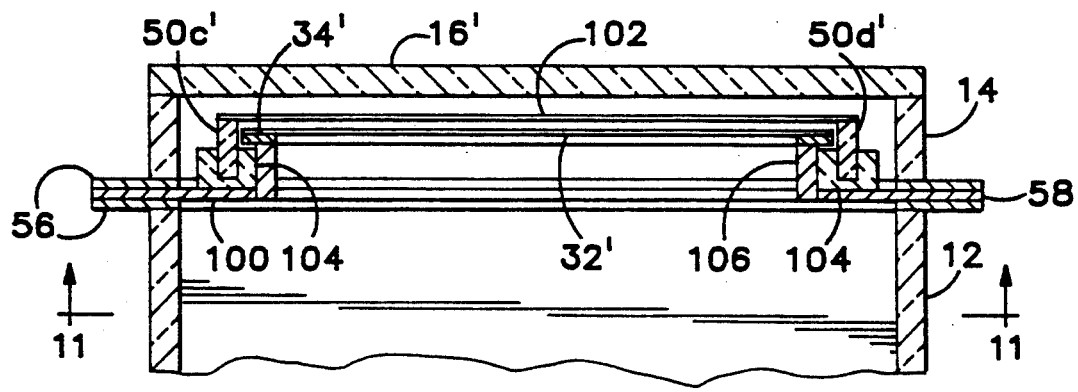
FIG. 10 is partially broken away longitudinal cross section (as taken at 10—10 in FIG. 11) of the forward end of a display cathode ray tube in accordance with a second embodiment of the present invention.
Figure 11:
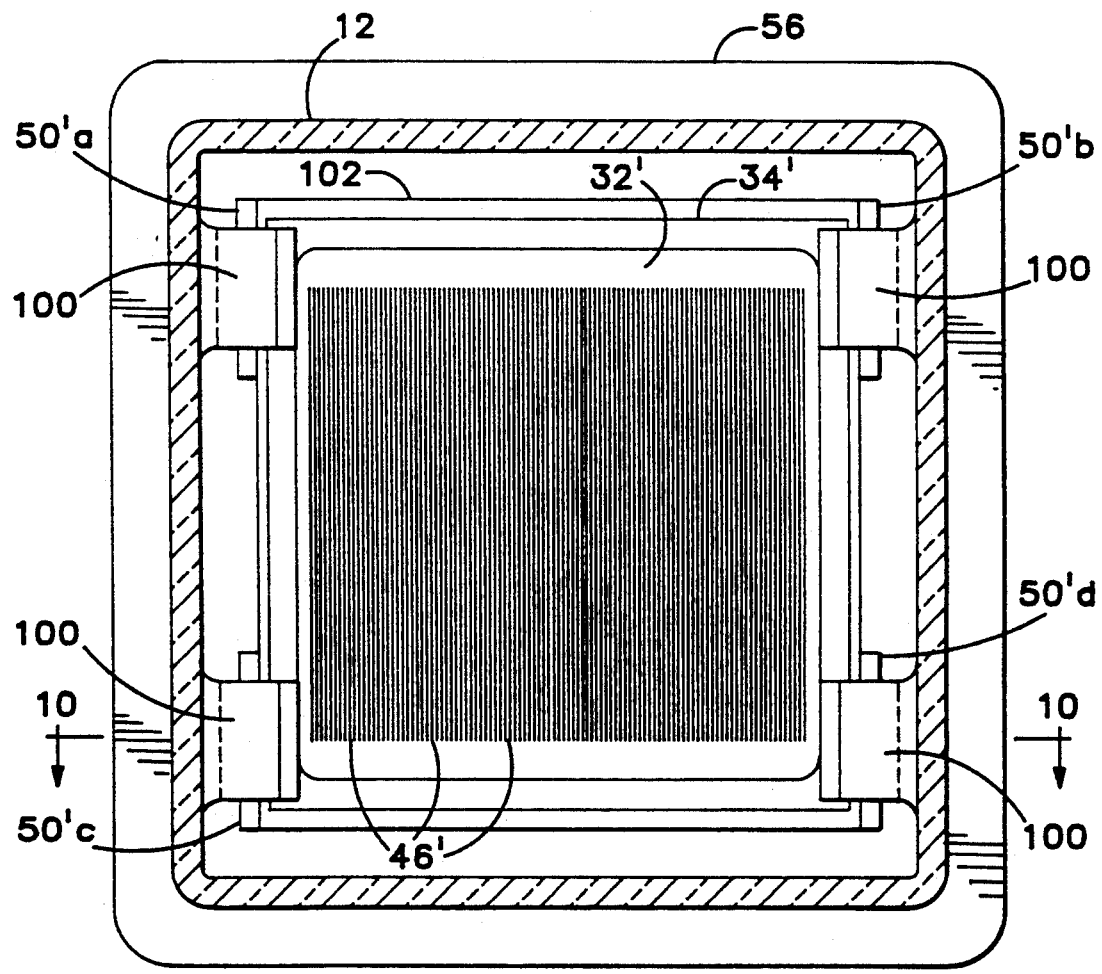
FIG. 11 is a transverse cross section of the same tube as illustrated in FIG. 10 as taken at 11—11 in FIG. 10.

An alternative embodiment of the present invention is illustrated in FIGS. 10 and 11 wherein CRT faceplate 16' is clear and the phosphor stripes (corresponding to phosphor stripes 44 in the previous embodiment) are provided on the rear surface of a quartz wafer 102 mounted rearwardly of and in parallel relation to the faceplate. L-shaped support plates 100 extend inwardly of the CRT envelope between flanges 56 proximate the corners of the quartz wafer and the corners of shadowmask supporting frame 34'. The frame 34', across which shadowmask 32' is stretched, is secured to forwardly extending arms 106 of the support plates 100 and is therefore stationary. Secured to the forward sides of support plates 100 are ceramic holders 104 within which piezoelectric bimorph actuators 50' are held, the forward ends of the actuators 50 being joined to the quartz wafer 102 at the edge thereof proximate to its corners in the illustrated embodiment.

As in the previous embodiment, slots 46' in shadowmask 32' are substantially aligned with corresponding phosphor stripes on the rearward side of quartz wafer 102, except that during operation of the device a bias is applied to the bimorph actuators such that the phosphor stripes are skewed slightly causing the upper end of a phosphor stripe to be normally aligned with a given slot 46' in the shadowmask while the lower end of the same stripe is aligned with a next adjacent slot.

The embodiment of FIGS. 10 and 11 is operated in substantially the same manner as the previous embodiment, employing the circuitry depicted in FIG. 8, but wherein the phosphor stripes carried by quartz wafer 102 are moved horizontally back and forth in response to a triangular wave as illustrated in FIG. 3. The embodiment of FIGS. 10 and 11 has an advantage in that the colors presented are not separated in space, but a mixture of colors is produced at the same point so far as the viewer is concerned. Thus, this embodiment produces improved color fusion. However, the embodiments of FIGS. 5–6 or FIGS. 12–13 are preferred because of simpler construction and hence more economical cost of manufacture.

Figure 12:
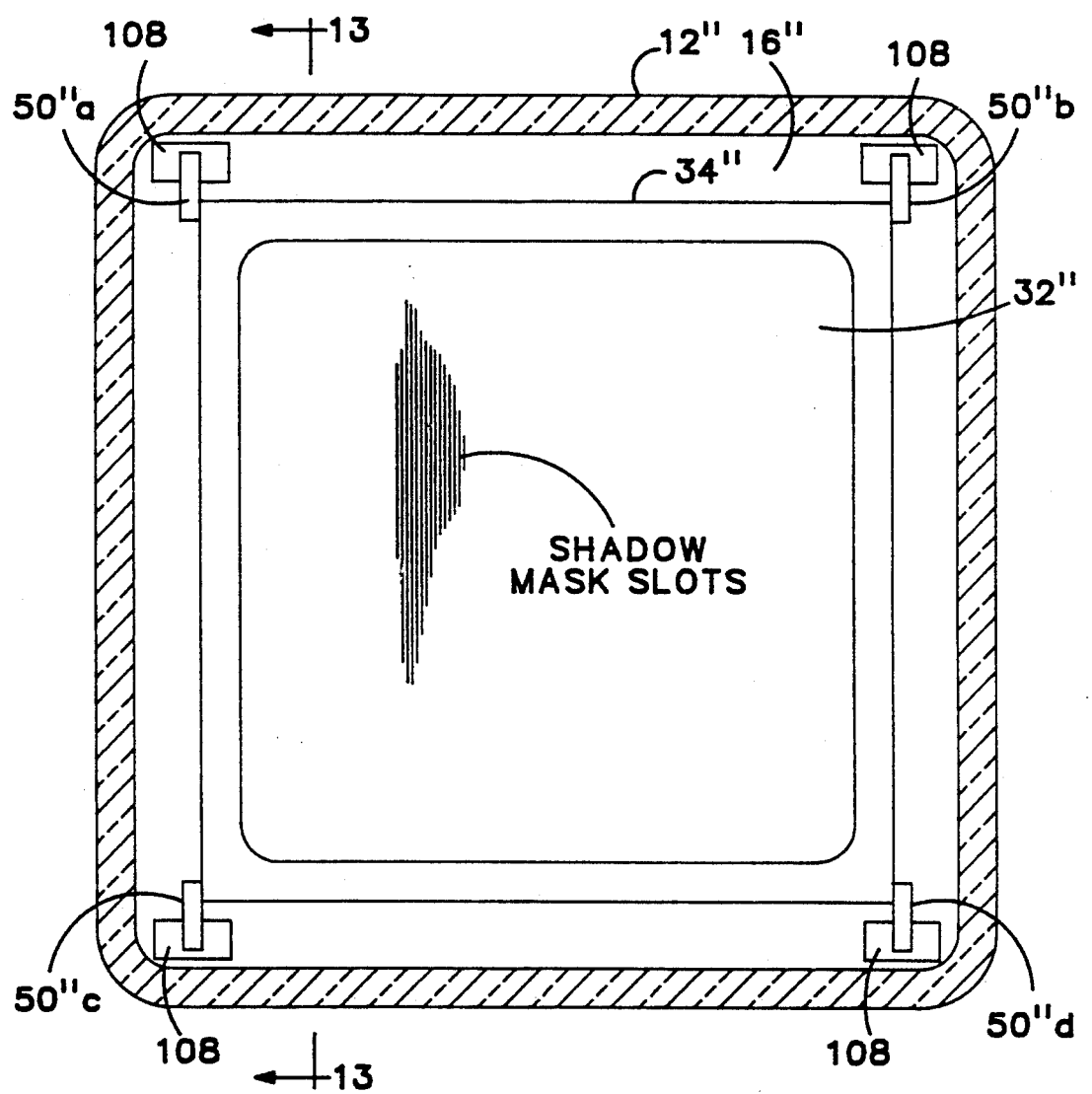
FIG. 12 is a transverse cross section (as taken at 12—12 in FIG. 13) of a forward end of a display tube in accordance with a third embodiment of the present invention.
Figure 13:
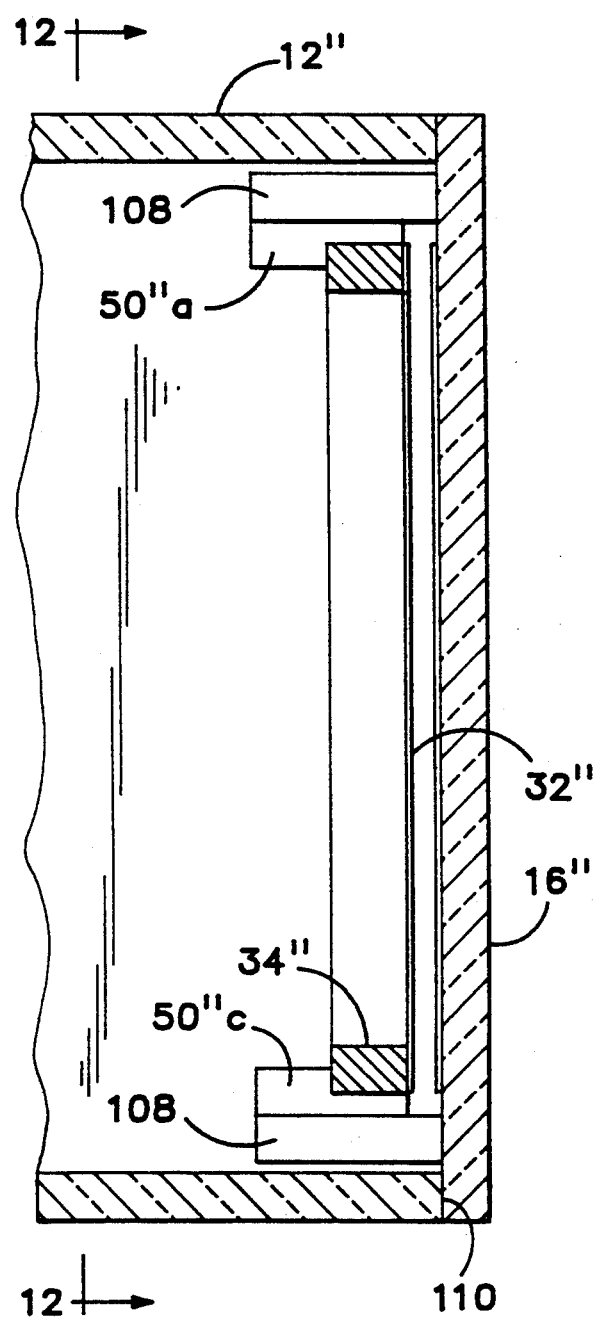
FIG. 13 is a partially broken away longitudinal cross section of the same tube as illustrated in FIG. 12 as taken at 13—13 in FIG. 12.

A third embodiment according to the present invention is illustrated in FIGS. 12 and 13 which differs from the embodiment of FIGS. 5 and 6 primarily in that the bimorph actuators are secured to the faceplate rather than to flanges between the funnel assembly and front end assembly of the tube. Ceramic holders 108 are frit sealed to the faceplate in the same manner that the faceplate is frit sealed to funnel portion 12" at 110, and the holders 108 extend rearwardly for supporting bimorph actuators 50" proximate respective corners of shadowmask 32" to which the respective bimorph actuators are secured. Bimorph actuator 50"a and 50"b extend downwardly from holders 108 in cantilever fashion to corners of the shadowmask, while bimorph actuators 50"c and 50'd extend upwardly in cantilever fashion so that as the bimorph actuators are caused to bend left or right from the vertical plane, the shadowmask supported between the distal ends of the actuators is caused to execute leftward and rightward movement. The embodiment of FIGS. 12 and 13 is otherwise constructed and operated in the same manner as the embodiment of FIGS. 5–6. The FIGS. 12–13 embodiment provides the advantages of economy in that fewer assembly steps are required. As in the previous embodiments it will be apparent that resilient biasing means or the like can be substituted for actuators on one side of the shadowmask.

In the form described for the hereinabove described embodiments of the invention, the display format is field sequential. That is, an entire red field may be written, then a green field, etc. However, the speed of movement of the mask in the first and third embodiments for example, or the quartz wafer in the second embodiment, can be increased such that only a few lines are written in each color in each mask cycle. For example, at a 3,000 Hz mask frequency, ten lines of red can be written, then ten lines of green, etc.

In accordance with the present invention, a color display tube is provided having substantial advantages over the prior art in particular regard to a miniaturized version. A single electron gun is employed in the above described embodiments rather than a plurality of electron guns which not only reduces the size of the neck of the tube and expense of manufacture but also alleviates problems associated with misconvergence, registration and resolution. As a further result of having a smaller neck, the smaller yoke which may be employed can be more efficient and deflection can be faster. In the illustrated examples, a thousand line display (1,000 line triads) is provided on a screen which measures only about one and one-quarter inches in height. The construction is straightforward and economical compared with prior art efforts at miniaturized color tubes, as a result of bringing about the cyclical relative movement between the shadowmask and screen in synchronization with color input information.

Figure 14:
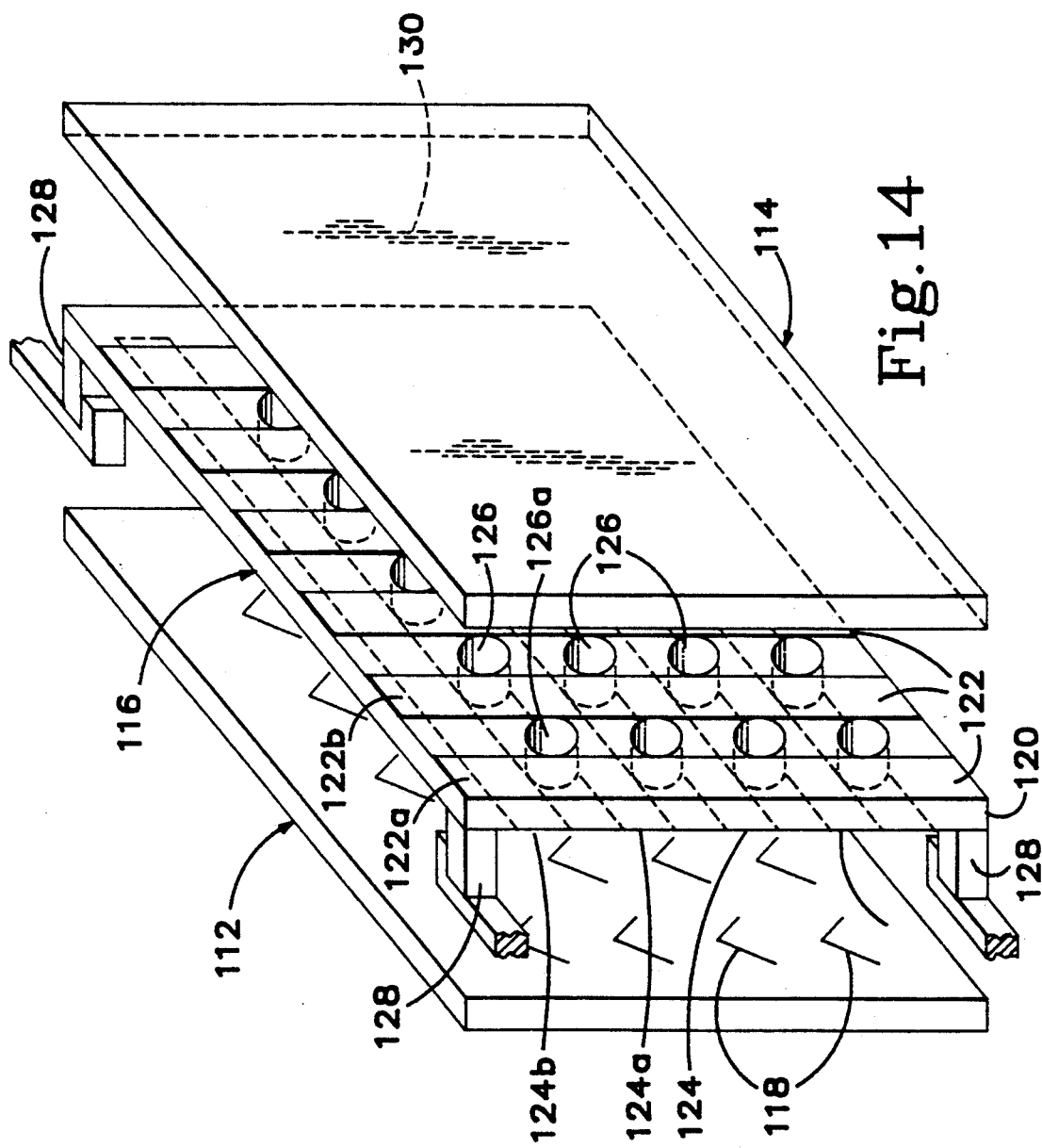
FIG. 14 is a perspective representation of a display device in accordance with a fourth embodiment of the present invention.

In accordance with the fourth embodiment, the shadowmask as hereinbefore discussed is replaced with a gating array operated to pass or inhibit the flow of electrons at selected coordinate locations. Referring to FIG. 14, a panel display device is illustrated including an area type cathode 112, a faceplate or screen 114 and a gating array 116 juxtaposed therebetween. The area cathode may comprise an insulating panel supporting a plurality of wire cathodes 118 located in array fashion across the panel; alternatively, individual cathodes may comprise horizontal strip emitters or field emitters from which electrons are attracted toward gating array 116.

Gating array 116 in the illustrated embodiment comprises insulating panel or wafer 120 provided on the forward side thereof with a plurality of vertical conducting strips 122. The rearward side of the panel, the side toward cathode 112, includes a plurality of horizontal conducting strips 124 which are therefore perpendicular to strips 122. Conducting strips 122 and 124 are evenly spaced to define regions therebetween that are laser drilled to provide cylindrical apertures or openings 126 through which electrons from cathode 112 may pass. For instance if appropriate potentials are applied to rearward strips 124a and 124b as well as the strips 122a and 122b, an aperture 126a surrounded by these conductors will be enabled to pass electrons from cathode 112 to screen 114. Electrons are steered through array 116 to designated locations at the rear of the faceplate. On the other hand, if strongly negative potentials are applied to the four conductors mentioned, electrons will be blocked from passing through aperture 126a. Individual pixels are written at faceplate 114 depending upon the potentials received by the conductors of gating array 116. An array with further conductor layers can be employed for logically steering or blocking electrons in response to a reduced number of inputs.

As will be understood by those skilled in the art, the structure depicted in FIG. 14 is illustrative only and a practical structure is quite small, employing a large number of conductive strips on the forward and reverse sides of panel or wafer 120. Also it will be understood the structure is normally housed within an evacuated chamber. Although the panel type display device depicted in FIG. 14 has many advantages, achieving high resolution with this structure is difficult. However, alignment of the apertures 126 with phosphor stripes 130 on the rearward side of faceplate 114 is critical.

In accordance with the fourth embodiment of the present invention, panel or wafer 116 is supported by bimorph actuators 128 constructed and operated in the same manner as hereinbefore described with respect to the other embodiments of the invention. An appropriate bias can be applied to these actuators to adjust and maintain alignment. More importantly, the bimorph actuators 128 are suitably driven with a triangular waveform as hereinbefore described for providing a cyclic motion of array 116 in the horizontal direction to excite selected vertical color stripes on the rearward side of faceplate 114. In accordance with a preferred version, the pitch of the array apertures 126 in the horizontal direction is three phosphor stripes in width. The bimorph actuators translate panel 116 back and forth to bring about successive coincidence with the phosphor color stripes. As will also be understood, bimorph actuators 128 are also suitably biased so that a vertical column of apertures 126 is diagonally offset with respect to the phosphor stripes. In particular, a vertical column of apertures 126 is offset by one phosphor stripe width so that as the top aperture 126 in a column registers with a phosphor stripe of a given color, the bottom aperture 126 in the same column aligns with the next adjacent vertical phosphor stripe whereby cyclic operation can take place in the manner described above with respect to the other embodiments.

Providing the array 116 with cyclic translation dramatically reduces the number of connections which must be made to the array of conductive strips, since a given aperture is capable of directing electrons towards three different color phosphors. High resolution can be achieved with substantial miniaturization.

While plural embodiments of the present invention have been shown and described, it will be apparent to those skilled in the art that many other changes and modifications may be made without departing from the invention in its broader aspects. For example, although electron beam deflection is described, for the first three embodiments, as being substantially perpendicular to the shadowmask slots, the beam may be deflected in raster fashion along the slots. In such case, the beam can be blanked as the shadowmask or faceplate is translated between fields. The appended claims are therefore intended to cover all such changes and modifications as fall within the true spirit and scope of the invention.

I claim:

1. A display tube for reproducing color images on a screen in response to color input signal information, comprising:
   an electron gun structure for emitting an electron beam directed toward said screen, wherein the intensity of said beam is modulated in accordance with Z-axis image input information;
   deflection means for causing said electron beam to scan said screen in accordance with image synchronization input information provided in X and Y axes;
   said screen being provided with plural phosphor material areas each adapted to emit light of a selected color when scanned by said electron beam;
   a shadowmask interposed between said electron gun structure and said screen, said shadowmask having a multiplicity of openings through which at least a portion of said electron beam may pass to reach areas of phosphor material as an opening in said mask is substantially aligned with an area of phosphor material; and
   means for providing lateral relative movement between said shadowmask and said screen to vary the alignment between screen areas and said openings in order to change the color of light in said image.

2. The apparatus according to claim 1 wherein said means for providing relative movement translates on a cyclic basis and wherein the Z-axis image input information is synchronized to represent the color of the screen areas substantially aligned with said openings.

3. The apparatus according to claim 2 including means for storing and selectively reversing Z-axis image input information in accordance with the direction of cyclic translation of said means for providing relative movement.

4. The apparatus according to claim 1 wherein said means for producing relative movement comprises means for moving said shadowmask relative to a fixed screen, said openings comprising parallel slots and said screen areas comprising stripes of phosphor material representing primary colors.

5. The apparatus according to claim 4 wherein said slots are skewed from being parallel with said stripes by substantially one stripe width in the distance along the length of a stripe.

6. The apparatus according to claim 1 wherein said means for producing relative movement comprises means for moving said screen relative to a fixed shadowmask, said openings comprising parallel slots and said screen areas comprising stripes of phosphor material representing primary colors.

7. The apparatus according to claim 6 wherein said slots are skewed from being parallel with said stripes by substantially one stripe width in the distance along the length of said stripe.

8. The apparatus according to claim 1 wherein one of said shadowmask and said screen is a fixed member and the other is a movable member, and said means for providing relative movement comprises piezoelectric bimorph means.

9. The apparatus according to claim 8 wherein said piezoelectric bimorph means comprise piezoelectric bimorph actuators upon which said movable member is mounted proximate corners thereof in cantilever fashion, and including means for driving said actuators with a cyclic waveform.

10. The apparatus according to claim 9 wherein said waveform comprises a triangular wave.

11. The apparatus according to claim 9 wherein said openings comprise slots parallel to one another and said screen areas comprise stripes of phosphor material parallel to one another, including means for providing DC biasing between selected pairs of said actuators to produce selected skewing between said slots and said stripes.

12. The apparatus according to claim 9 comprising four said piezoelectric bimorph actuators upon which said movable member is mounted proximate its corners in cantilever fashion, and wherein said means for driving said actuators delivers said waveform in a push-pull manner to pairs of said actuators.

13. The apparatus according to claim 9 wherein said actuators are supported from the side of said tube.

14. The apparatus according to claim 9 wherein said actuators are supported from the faceplate of said tube.

15. A display tube for reproducing color images on a screen in response to color input signal information, comprising:
   an electron gun structure for emitting an electron beam directed toward said screen, wherein the intensity of said beam is modulated in accordance with Z-axis image input information;

deflection means for causing said electron beam to scan said screen in accordance with image synchronization input information provided in X and Y axes;

said screen being provided with plural phosphor material areas each adapted to emit light of a selected color when scanned by said electron beam;

a shadowmask interposed between said electron gun structure and said screen, said shadowmask having a multiplicity of openings through which at least a portion of said electron beam may pass to reach areas of phosphor material as an opening in said mask is substantially aligned with an area of phosphor material; and means for providing lateral relative positioning between said shadowmask and said screen to change the alignment between screen areas and said openings.

16. The apparatus according to claim 15 wherein said means for providing relative positioning comprises piezoelectric bimorph means.

17. The apparatus according to claim 16 including means for applying a bias to said piezoelectric bimorph means.

18. A display device for reproducing color images on a screen in response to color input signal information, comprising:

a source means for emitting electrons;

said screen being provided with plural phosphor material areas each adapted to emit light of a selected color in response to electron emission from said source means;

control means interposed between said source means and said screen, said control means having a multiplicity of openings through which at least a portion of said electrons from said source may pass to reach areas of phosphor material as an opening in said control means is substantially aligned with an area of phosphor material; and means for providing lateral relative movement between said control means and said screen to change the alignment between screen areas and said openings.

19. The apparatus according to claim 18 wherein said means for providing relative movement translates on a cyclic basis and wherein image input information is applied to said control means and is synchronized to represent the color of the screen areas substantially aligned with a said opening.

20. The apparatus according to claim 18 wherein said means for producing relative movement comprises means for moving said control means relative to a fixed screen.

21. The apparatus according to claim 18 wherein one of said control means and said screen is a fixed member and the other is a movable member, and said means for providing relative movement comprises piezoelectric bimorph means.

22. The apparatus according to claim 21 wherein said piezoelectric bimorph means comprise piezoelectric bimorph actuators upon which said movable member is mounted proximate corners thereof in cantilever fashion, and including means for driving said actuators with a cyclic waveform.

23. The apparatus according to claim 22 wherein said waveform comprises a triangular wave.

24. The apparatus according to claim 22 comprising four said piezoelectric bimorph actuators upon which said movable member is mounted proximate its corners in cantilever fashion, and wherein said means for driving said actuators delivers said waveform in a push-pull manner to pairs of said actuators.

25. The display device according to claim 18 wherein said source means comprises an electron gun and said control means comprises a shadowmask, said openings comprising slots in said shadowmask.

26. The display device according to claim 18 wherein said source means comprises a broad source of electrons and said control means comprises a gating array including a multiplicity of conductors responsive to input information for selectively passing electrons through said openings.

27. The display device according to claim 26 wherein said screen areas comprise stripes of phosphor material.

28. The display device according to claim 27 wherein said control means is translated so that an opening selectively registers with stripes of different colors, the spacing of said openings in the direction of movement of said control means being greater than the spacing of adjacent stripes.

29. The display device according to claim 27 wherein columns of said openings are skewed from being parallel with respect to said stripes.

* * * * *

UNITED STATES PATENT AND TRADEMARK OFFICE
CERTIFICATE OF CORRECTION

PATENT NO.  :  5,198,730
DATED       :  March 30, 1993
INVENTOR(S) :  Bernard K. Vancil It is certified that error appears in the above-identified patent and that said Letters Patent is hereby corrected as shown below:

Column 9, line 4, "50" should read --50'--.

Column 9, line 44, "50'd" should read --50"d--.

Signed and Sealed this

Fourteenth Day of December, 1993

Attest:

BRUCE LEHMAN

*Attesting Officer*  *Commissioner of Patents and Trademarks*